July 31, 1956  J. C. STEINMETZ  2,756,474
PIPE JOINT SEALING DEVICE
Filed June 23, 1953
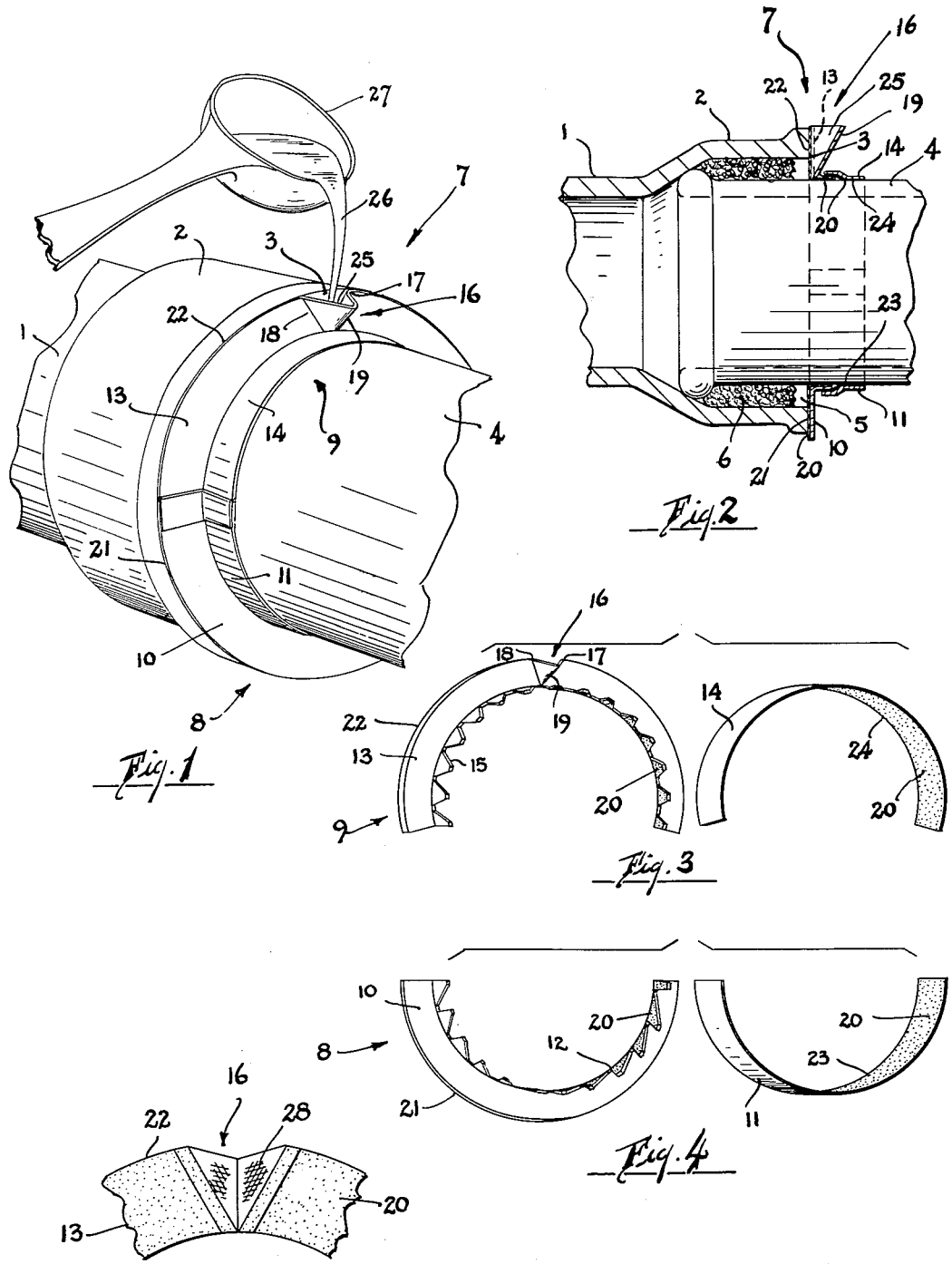
INVENTOR
JOHN C. STEINMETZ
BY Richard F. Carr
ATTORNEY United States Patent Office 2,756,474
Patented July 31, 1956

2,756,474
PIPE JOINT SEALING DEVICE
John C. Steinmetz, Anaheim, Calif.
Application June 23, 1953, Serial No. 363,644
4 Claims. (Cl. 22—118)

This invention pertains to a pipe joint sealing device and more particularly to a device whereby molten sealing material may be introduced into a pipe joint.

It is common practice in joining together sections of pipe to introduce the end of one pipe section into an enlarged bell portion on the end of another section of pipe. Molten sealing material is then introduced into the annular space between the two pipes to act as a positive seal when solidified. Molten lead is normally used for this purpose because this material is easily melted and solidifies to form a satisfactory seal. Directing the molten lead into the annular space between the two pipe sections, however, has caused considerable difficulty. Usually a flexible asbestos rope-like length is wrapped around the joint and left open at the top to provide an opening through which molten lead is subsequently poured. This device must be manually held in place and is therefore unwieldy and awkward to handle while pouring a ladle of hot lead. Furthermore, it does not adhere closely to the rough irregular surface common to such pipe and as a result a great deal of lead is wasted at each joint. Often the lead drips off and solidifies in icicle-like streamers which requires extra work to remove.

Therefore it is an object of this invention to provide a pipe joint sealing device which is convenient and easy to use.

Another object of this invention is to provide a pipe joint sealing device that prevents wastage of sealing material.

A further object of this invention is to provide a pipe joint sealing device which is retained in place without external applications of forces.

An additional object of the this invention is to provide a pipe joint sealing device which is disposable.

Yet another object of this invention is to provide a pipe joint sealing device which is made primarily from a paper material.

These and other objects will become apparent from the following detailed description taken in connection with the accompanying drawing in which Fig. 1 is a perspective view of the device of this invention attached to a pipe joint during a sealing operation;

Fig. 2 is a sectional view of the pipe joint of Fig. 1;

Fig. 3 is a perspective view of the components of the upper portion of the device of this invention;

Fig. 4 is a perspective view of the components of the lower portion of the device of this invention; and Fig. 5 is a fragmentary view of a modification of this invention.

Referring to the drawing, there is illustrated in Figs. 1 and 2 an ordinary joint between two pipes. Pipe section 1 includes an enlarged bell end portion 2 terminating at end wall 3. The adjoining pipe section 4 is received within bell section 2 with its end engaging the beginning of this portion. The outer diameter of pipe 4 is less than the inside diameter of bell section 2 so that an annular space 5 is provided between the pipes. Male pipe end 4 is thus received in female pipe end 2 in spaced relationship therewith. Oakum material 6 is provided in the inner portion of space 5. To seal this joint between the two pipes it is necessary to introduce lead or other sealing material into the remainder of the annular space between the pipes. Oakum 6 will prevent the sealant from running out of the joint past the end of pipe 4.

By the provisions of this invention it is a simple matter to direct the sealant where it belongs so that it will all be retained in annular space 5. Joint sealing device 7, illustrated in detail in Figs. 3 and 4, accomplishes this purpose. This device, when assembled, is ring shaped and adapted to circumscribe the pipes at the location of the joint. In the preferred embodiment device 7 is constructed in two sections, lower section 8 and upper section 9. The lower section has a generally semicircular contour extending for approximately 180 degrees. It has a flat radially extending face portion 10 from the inner edge of which extends axially projecting flange portion 11 when the device is assembled. It is preferred to make lower section 8 in two parts with face portion 10 having a serrated inner edge 12 which can be bent axially and secured to flange portion 11.

Upper section 9 is generally similar to lower section 8, being provided with radial face 13 and axial flange portion 14 adapted to be attached to and extend from serrated edge 15 thereof. This upper section should extend angularly for more than 180 degrees so that together the two sections cover more than 360 degrees. The upper end of section 9, opposite the open lower portion, is further provided with an outwardly projecting funnel section 16 which may be formed from face 13, bent outwardly at 17 and 18. A third bend 19 in the funnel causes it to be clearly defined and protrude beyond the plane of face 13.

Sections 8 and 9 of the device of this invention are made of any inexpensive highly flexible material. Ordinary paper or fibrous material has been found to be very satisfactory for this purpose. An adhesive 20 is applied to one side of this material so that it covers the inner face surfaces 21 and 22, and the inner flange surfaces 23 and 24. This adhesive is of the ordinary pressure sensitive type which will adhere to whatever it contacts upon application of slight pressure. This enables flanges 11 and 13 to be readily attached to the serrated edges of their corresponding face portions.

In order to effect a joint seal with this device, the two sections 8 and 9 are attached to adjoining pipes 1 and 2 at the location of the joint. Thus flanges 11 and 14 circumferentially engage the outer surface of pipe 4 just beyond end wall 3 of section 2 of pipe 1. Similarly, face portions 10 and 13 engage the outer end 3 of the bell portion of pipe 1. Adhesive material 20 secures these elements to all portions of the rough pipe exterior to the pipe with the application of hand pressure. By defining more than 360 degrees the two sections overlap so that there is no gap therebetween when they are installed on the pipe. Of course the flanges 11 and 14 are proportioned so that the inner surfaces thereof are substantially complementary to the outer diameter of pipe 4 so that they will not be folded or torn yet will engage all portions of a circumference of this pipe. Similarly, faces 10 and 13 completely cover the end of bell section 2 and are complementary thereto. It is quite important that sections 8 and 9 are made from a highly flexible material. Such material has a limp character, not being self-supporting. This enables them to adhere to all parts of the surfaces of the pipes engaged despite the surface roughness which is inherent in such pipes. A relatively stiff bendable material will not so engage the pipe and is not satisfactory. A material which does not closely engage the pipes in this manner will not provide an adequate seal to retain the molten material which is subsequently introduced into space 5 between the pipes.

When sections 8 and 9 have been installed on the pipes, as illustrated in Figs. 1 and 2, space 5 between the pipe ends will be perfectly sealed with respect to the exterior thereof. Funnel section 16 will extend at the top of the pipe joint, as shown in the drawing, leaving an opening 25 communicating with annular space 5. Next molten lead 26 or other sealing material may be poured from ladle 27 through funnel 16 and into the annular space for effecting the joint seal. None of this lead can escape because of the close adherence of sections 8 and 9 to the pipes. The lead ladle is easily handled because it is unnecessary to give further attention to the sealing device 7 once it is in place on the pipes. Despite the fact that molten lead, which must have a temperature of at least 621° F. in order to attain the molten state, is used to form the pipe joint seal, the sealant material will all be retained by device 7 although it be made of paper or other highly inflammable material. This is because the device is made of relatively thin and therefore highly heat transmissive material which conducts the heat from the lead to the surrounding atmosphere with sufficient rapidity to preclude damage to the device itself. A material without such characteristics might be damaged by the hot sealing material.

When all the lead in space 5 has solidified the joint is complete and device 7 need not even be removed from the pipes. By being made of paper this device is so cheap that it is normally preferred to discard it after a joint has been made, using one of these devices for each pipe joint made. The amount of lead saved far exceeds the cost of these items. However, if desired the device may be removed after the pipe joint has been formed and may be used again for other joints.

A modification of the invention is illustrated in Fig. 5. For this embodiment a small section of insulative material 28 is used to line the funnel portion 16. This material may be a small segment of glass cloth which is secured to the funnel portion by means of the adhesive material 20. It may be desirable to utilize this material at the funnel when the molten pipe joint sealing material is heated to a particularly high temperature. In such cases there is a tendency to char the paper material at the location of the funnel without this addition, although the other portions of device 7 will remain undamaged.

It is obvious from the foregoing description that certain modifications of this invention may be made without departing from the spirit and scope thereof. For example, the flanges and face portions of each section may be constructed from one piece of material, the attachment as described being mainly for convenience of manufacture. Or sections 8 and 9 may be made of one piece having an open end so that the device may overlappingly circumscribe the pipe. The two-section design is preferred for ease of application of the device to the pipe joint. Furthermore it is not necessary to use a pressure sensitive adhesive material which again has been selected as the most convenient to use.

The foregoing detailed description is therefore limited only by the appended claims.

I claim:

1. A device for filling a pipe joint wherein a male pipe end is spacedly received within a female pipe end, said device comprising an upper member having a radially extending face portion substantially complementary to portions of the end of said female pipe, said face portion including a projecting funnel and an axially extending inner edge, and an axially extending flange portion attached to said inner edge, said flange portion being substantially complementary to a circumferential portion of said male pipe; and a lower member, said lower member having a radially extending face portion substantially complementary to portions of said end of said female pipe, said face portion including an axially extending inner edge, and an axially extending flange portion attached to said inner edge, said flange portion being substantially complementary to a circumferential portion of said male pipe, said members being provided with an adhesive material on said complementary surfaces whereby said members are adapted to overlappingly circumscribe said male pipe at the location of said female pipe end and are attached to said pipes by said adhesive material, said members being highly flexible whereby intimate contact with said pipes is obtained and said funnel is adapted to receive and direct molten sealing material into said space between said pipes, said members further being highly heat transmissive whereby damage thereto from said molten sealing material is precluded.

2. A device for sealing a joint between a male pipe end portion spacedly received within a female pipe terminating in a substantially radial end surface, said device comprising a flexible annular member of relatively thin limp paper, said member including a substantially radial portion the inner edge of which is dimensioned to circumscribe such a male pipe and the outer edge of which has a circumference substantially the same as that of the end surface of such a female pipe, said radial portion including an integral funnel inclined outwardly away from said inner edge thereof, said member further including a flange portion extending axially from said inner edge in the same general direction as said funnel, said flange being dimensioned to complementarily circumscribe said male pipe end; and a pressure sensitive adhesive on the inner surface of said flange portion and the surface of said radial portion remote from said flange portion for providing a means for attaching said flexible member to a pipe joint to be sealed.

3. In combination with a joint between a male pipe end portion spacedly received within a female pipe end terminating in a substantially radial end surface, a device for directing molten lead into the space between said pipes and retaining the same therein comprising a flexible annular member of relatively thin limp paper circumscribing said male pipe, said member including a substantially radial portion interconnecting said male pipe and said female pipe and extending complementarily along said end surface, said radial portion including an integral funnel defined by a segment thereof the outer edge of which is inclined axially away from said end surface in a spaced relationship therewith and the inner edge of which extends to the exterior of said male pipe at substantially the radial plane of said end surface for thereby providing a means for directing molten lead into the space between said pipes, said member further including an axial flange portion projecting from the inner edge of said radial portion, said flange portion complementarily circumscribing said male pipe; and a pressure sensitive adhesive interposed between said flexible member and said pipes for providing an attachment therebetween to preclude loss of sealant from said space.

4. A device for filling a pipe joint wherein a male pipe end is spacedly received within a female pipe end, said device comprising an upper member and a lower member cooperating to overlappingly circumscribe said male pipe, each of said members including a radially extending face portion substantially complementary to radial portions of said female pipe end, said face portion including an axially extending inner edge, each of said members further including an axially extending flange portion attached to said inner edge and substantially complementary to circumferential portions of said male pipe, the face portion of said upper member including a projecting funnel, said members including an adhesive material on said complementary portions for attaching the same to said pipe ends, said members being of a highly flexible and heat transmissive material for obtaining intimate contact with said pipe ends so that said funnel is adapted to receive and direct molten sealing material into said space between said pipe ends, and heat is conducted away from said members to preclude damage thereto.

References Cited in the file of this patent

UNITED STATES PATENTS 1,828,075   Saunders -------------- Oct. 20, 1931

FOREIGN PATENTS 14,630   Great Britain ------------------ 1913